(12) United States Patent
Masuda et al.

(10) Patent No.: US 11,899,210 B2
(45) Date of Patent: Feb. 13, 2024

(54) WEARABLE IMAGE DISPLAY DEVICE

(71) Applicant: Blue Optech Co., Ltd., Kyoto (JP)

(72) Inventors: Makoto Masuda, Kyoto (JP);
Nobuhiro Shirai, Kyoto (JP)

(73) Assignee: BLUE OPTECH CO., LTD., Kyoto (JP)

( * ) Notice: Subject to any disclaimer, the term of this patent is extended or adjusted under 35 U.S.C. 154(b) by 800 days.

(21) Appl. No.: 16/969,777

(22) PCT Filed: Oct. 23, 2018

(86) PCT No.: PCT/JP2018/039274
§ 371 (c)(1),
(2) Date: Aug. 13, 2020

(87) PCT Pub. No.: WO2019/159436
PCT Pub. Date: Aug. 22, 2019

(65) Prior Publication Data
US 2020/0409155 A1 Dec. 31, 2020

(30) Foreign Application Priority Data

Feb. 13, 2018 (JP) ................. 2018-023201

(51) Int. Cl.
*G02B 27/01* (2006.01)
*G02B 27/28* (2006.01)
(Continued)

(52) U.S. Cl.
CPC ....... *G02B 27/0172* (2013.01); *G02B 6/0035* (2013.01); *G02B 27/283* (2013.01);
(Continued)

(58) Field of Classification Search
CPC .............. G02B 27/1072; G02B 6/0035; G02B 27/283; G02B 27/286; G02B 2027/0178; G02F 1/136277; G02F 2203/02
(Continued)

(56) References Cited

U.S. PATENT DOCUMENTS 8,988,315 B2   3/2015   Mukawa et al.
9,664,906 B2   5/2017   Mukawa et al.
(Continued)

FOREIGN PATENT DOCUMENTS

CN   107533227 A   1/2018
CN   107664842 A   2/2018
(Continued)

OTHER PUBLICATIONS

CNIPA The First Office Action for corresponding CN Application No. 201880086180.6; dated Aug. 4, 2021.
(Continued)

*Primary Examiner* — Joseph P Martinez
*Assistant Examiner* — Grant A Gagnon
(74) *Attorney, Agent, or Firm* — CANTOR COLBURN LLP (57) ABSTRACT

In order to allow easy maintenance and convenient usage, the present invention is provided with an image light output unit, an image light transmitting unit, and an image light emitting unit. The image light output unit and a portion of the image light transmitting unit constitute an image source-side section. The remainder of the image light transmitting unit and the image light emitting unit constitute an image display-side section. The image source-side section and the image display-side section are respectively divided into separate unit structures. As a result, the present invention allows for easy maintenance and convenient usage.

6 Claims, 9 Drawing Sheets

(51) Int. Cl.
*G02F 1/1362* (2006.01)
*F21V 8/00* (2006.01)

(52) U.S. Cl.
CPC ..... *G02B 27/286* (2013.01); *G02F 1/136277* (2013.01); *G02B 2027/0178* (2013.01); *G02F 2203/02* (2013.01)

(58) Field of Classification Search
USPC .......................................... 359/489
See application file for complete search history.

(56) References Cited

U.S. PATENT DOCUMENTS

| | | |
|---|---|---|
| 2006/0228073 A1 | 10/2006 | Mukawa et al. |
| 2007/0097513 A1 | 5/2007 | Amitai |
| 2014/0232619 A1 | 8/2014 | Hiraide |
| 2015/0138451 A1 | 5/2015 | Amitai |
| 2015/0212328 A1 | 7/2015 | Enokido |
| 2016/0266398 A1 | 9/2016 | Poon et al. |
| 2016/0357016 A1 | 12/2016 | Cakmakci et al. |
| 2017/0045744 A1 | 2/2017 | Amitai |

FOREIGN PATENT DOCUMENTS

| | | |
|---|---|---|
| EP | 3259523 A1 | 12/2021 |
| JP | 2007505352 A | 3/2007 |
| JP | 2014160112 A | 9/2014 |
| JP | 5678460 B2 | 3/2015 |
| JP | 2015142336 A | 8/2015 |
| JP | 2017040694 A | 2/2017 |
| JP | 2017520013 A | 7/2017 |
| WO | 2005093493 A1 | 10/2005 |
| WO | 2016132347 A1 | 8/2016 |

OTHER PUBLICATIONS

International Search Report for International Application No. PCT/JP2018/039274; dated Jan. 15, 2019.

WEARABLE IMAGE DISPLAY DEVICE

CROSS REFERENCE TO RELATED APPLICATIONS

This is a U.S. national phase of application No. PCT/JP2018/039274, filed on Oct. 23, 2018. Priority under 35 U.S.C. § 119(a) and 35 U.S.C. § 365(b) is claimed from Japanese Patent Application No. 2018-023201 filed on Feb. 13, 2018, the disclosure of which are also incorporated herein by reference.

TECHNICAL FIELD

The present invention relates to a wearable image display.

BACKGROUND ART

Wearable image displays are disclosed in, for example, PLT 1 and PLT 2. A head mounted display disclosed in PLT 1 comprises an image generator and a light guide unit including a light guide plate, a first deflector, and a second deflector. The head mounted display of PLT 1 is to project a picture generated by an image generator to the observer or user via the light guide plate of the light guide unit, the first deflector means and the second deflector. Since the head-mounted display of PTL 1 has an integrated structure of the image generator and the light guide unit, it can be easily used by mounting it on the head of the observer.

An image display device disclosed in PTL 2 comprises a controller provided with a modulated light generator and a control unit, a frame provided with a scanner and a deflector, a cable connecting the controller and the frame, and a separation part provided at a middle of the cable. The image display disclosed in PTL 2 is to propagate a modulated light generated by the controller through the cable to the frame and deflect the propagated light from the frame toward the observer. In the image display disclosed in PLT 2, since the controller and the frame can be separated from each other by the separation portion of the cable, the controller and the frame can be easily maintained individually.

CITATION LIST

Patent Literature

[PTL 1]: JP 5678460 B
[PTL 2]: JP2017-40694 A

SUMMARY OF INVENTION

Technical Problem

However, in the head mounted display of PTL, since the image generator and the light guide unit are structured integrally, these cannot be easily maintained individually. Further, in the image display of PTL 2, since the controller and the frame are connected via the cable, the frame must be put on the observer's head while the controller must be held by the observer's hand or carried in a person's clothes pocket or bag, it cannot be used easily.

An object of the present invention is to provide a wearable image display that can be easily maintained and can be used easily.

Solution to Problem

A wearable image display according to the present invention comprises: an image light output unit for outputting an image as image light; an image light transmission unit for transmitting the image light output from the image light output unit; an image light emitting unit for emitting the image light transmitted from the image light transmission unit to the outside; wherein: the image light output unit and a part of the image light transmission unit constitutes an image source side section; the rest of the image light transmission unit and the image light emitting unit constitute an image display side section; and the image source side section and the image display side section are separately divided into unit structures.

The wearable image display according to this invention preferably further comprises a mounting unit to be worn on a user's face, wherein the image display side section is attached to the mounting unit.

Preferably in the wearable image display according to this invention, the image light output unit may include: a light source, a light control component for controlling the light from the light source to make a controlled light, and a reflective image modulation device for reflecting the controlled light to output the image light; the image light transmission unit may include: a polarization beam splitter for reflecting the controlled light from the light control component to the reflective image modulation device, a light reflector for reflecting the image light from the reflective image modulation device passing through the polarization beam splitter to the polarization beam splitter side, a quarter-wave plate disposed between the polarization beam splitter and the light reflector, a transit optics for relaying the image light from the reflective image modulation device, passing though the polarization beam splitter, passing though the quarter-wave plate, reflected by the light reflector, passing though the quarter-wave plate again and reflected by the polarization beam splitter, and a light guide plate for guiding the image light relayed by the transit optics to the image light output unit; the image light output unit includes: a plurality of half mirrors disposed in a light guide plate for emitting the image light guided in the light guide plate to the outside; the image source side section includes the light source, the light control component, the reflection type image modulation device, the light reflector and the quarter-wave plate in a unit structure, and the image display side section includes the polarization beam splitter, the transit optics, the light guide plate, and the plurality of half mirrors in a unit structure.

Preferably in the wearable image display according to this invention, the image source side section may include a mounting member on which the reflective image modulation device and the light reflector/the quarter-wave plate are attached respectively facing each other with a space therebetween, and the light source and the light control component are attached in a direction intersecting with the facing direction of the reflective image modulation device, the light reflector and the quarter-wave plate respectively, wherein: an opening is provided in a portion of the mounting member facing the light source and the light control component with a space therebetween, and the opening communicates with the space such that the polarization beam splitter is stored in and taken out of the space.

Preferably in the wearable image display according to this invention, the image display side section may be configured as the polarization beam splitter and the transit optics are fixed to each other, and the transit optics and the light guide plate may be fixed to each other, and the refractive index of the polarization beam splitter may be larger than the refractive index of the transition optical body and the refractive index of the light guide plate.

Preferably in the wearable image display according to this invention, the plurality of half mirrors may have a same reflectance regardless of the angle of incidence on surfaces.

An wearable image display according to this invention comprises a light guide plate disposed a plurality of half mirrors therein, wherein the plurality of half mirrors have a same reflectance regardless of the angle of incidence on surfaces.

Advantageous Effects of Invention

The wearable image display of tis invention can be easily maintained and can be used easily.

BRIEF DESCRIPTION OF DRAWINGS

FIG. 9 A is an explanatory view showing optical paths of image light in the light guide plate and the half mirror;

FIG. 9 B is an explanatory view showing optical paths of background light in the light guide plate and the half mirror.

DESCRIPTION OF EMBODIMENTS

Figure 5:
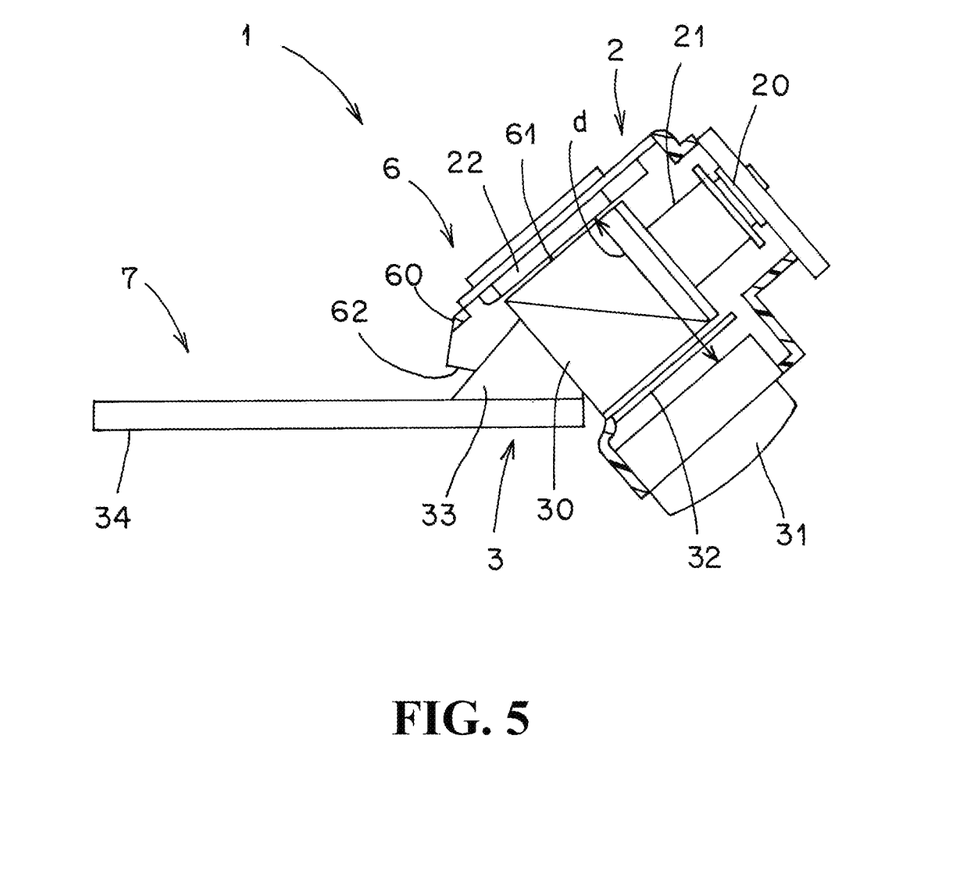
FIG. 5 is an explanatory view showing a state where the image source side portion and the image display side portion are integrally assembled in a partial (main part) cross section.
Figure 6:
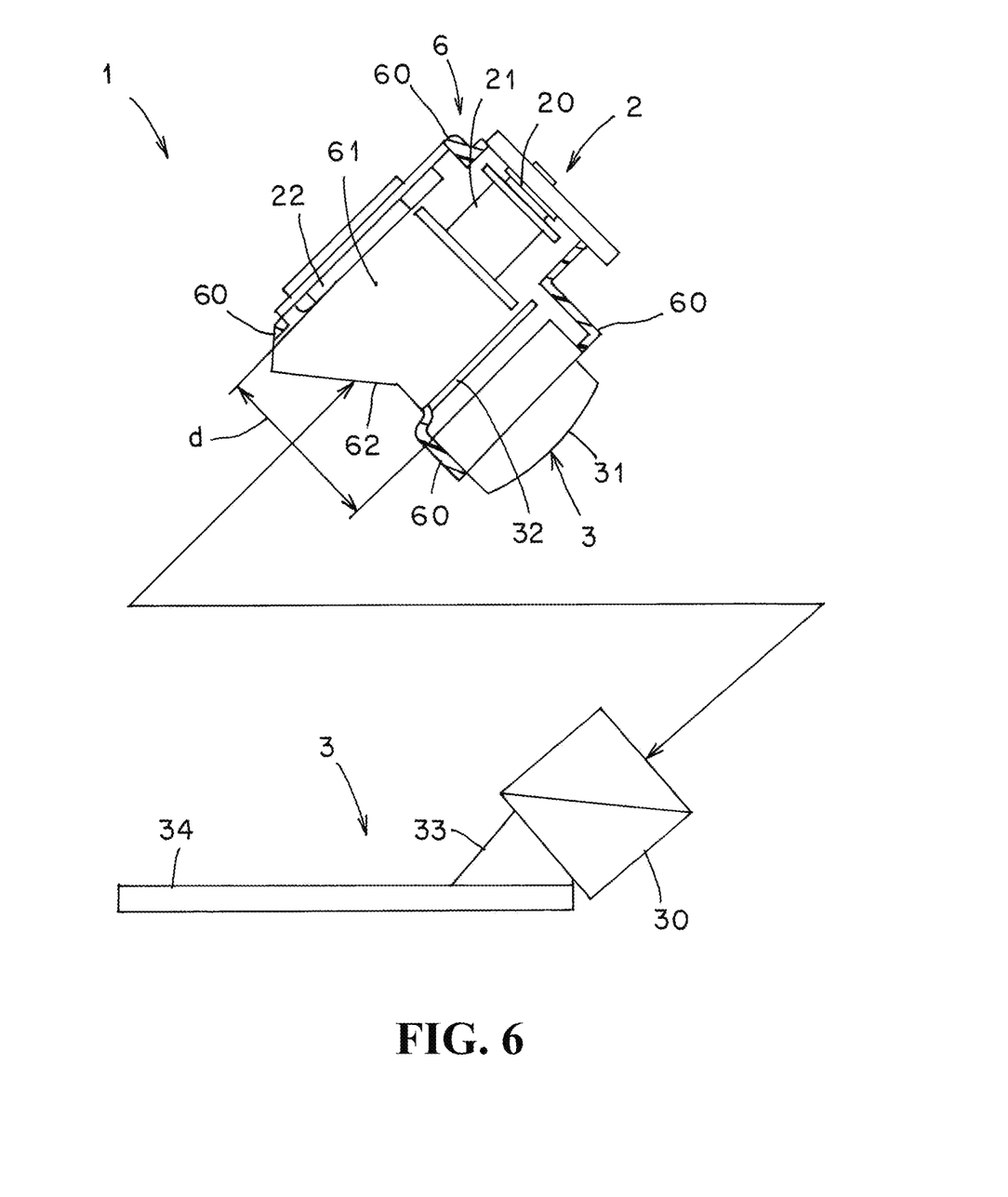
FIG. 6 is an explanatory view showing a state where the image source side portion and the image display side portion are separately removed in a partial (main part) cross section.
Figure 7:
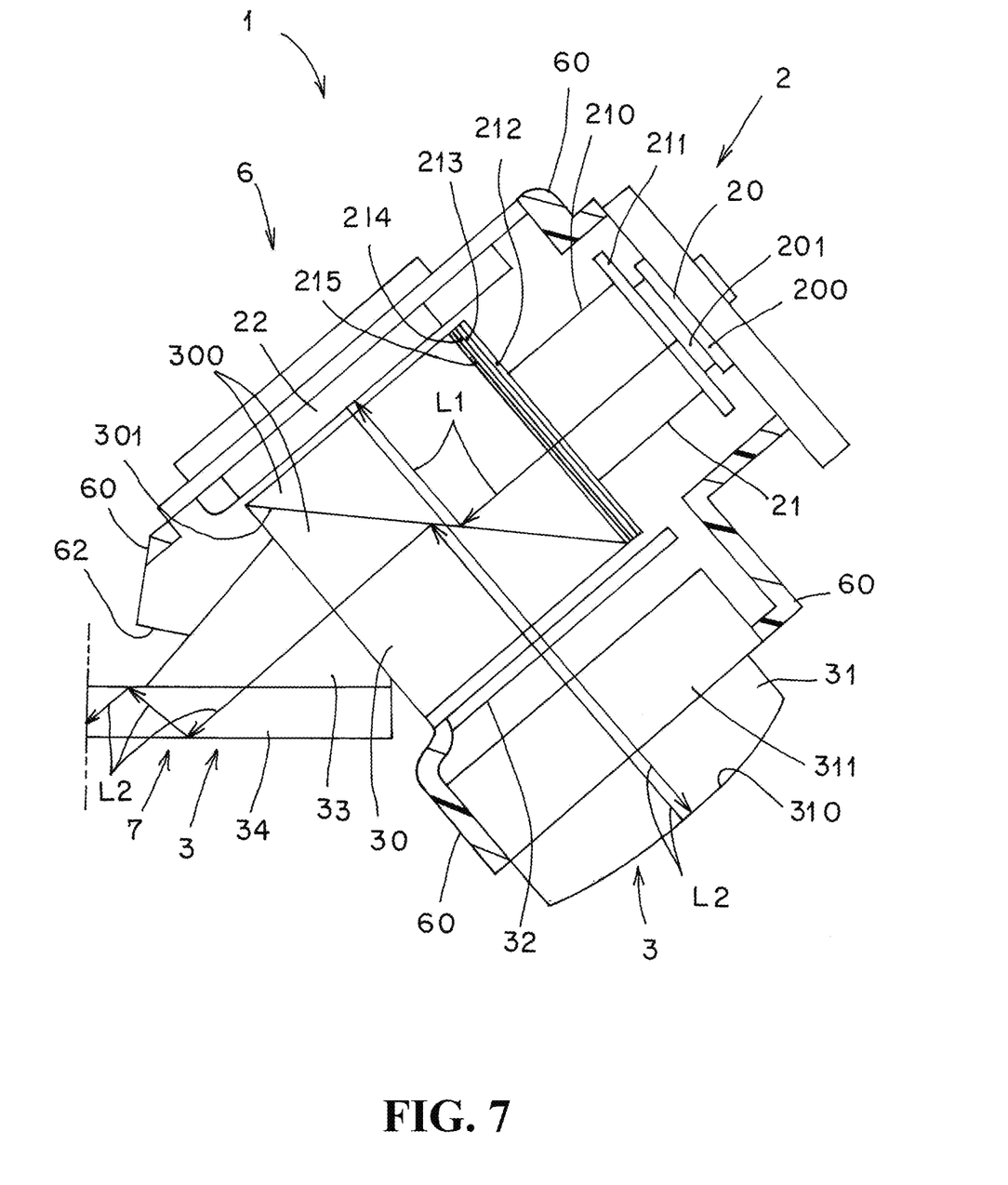
FIG. 7 is an explanatory view showing an optical path of image light in a partially (main part) enlarged cross section.

It will be described hereinafter an embodiment of a wearable image display according to the present invention and one modification example of the disposition of a plurality of half mirrors in a light guide plate in detail with reference to the drawings. In FIG. 5 to FIG. 7, hatching of components other than the mounting member are omitted. Further, in FIG. 8 to FIG. 10, hatching of the light guide plate is omitted. Further, solid arrows in the drawings indicate light.

Explanation of an Embodiment

FIG. 1 to FIG. 9 show an embodiment of a wearable image display according to the present invention. The configuration of the wearable image display according to this embodiment will be described below. In the drawing, reference sign 1 indicates the wearable image display according to this embodiment.

Explanation of the Wearable Image Display 1

As shown in FIGS. 1 to 8, the wearable image display 1 comprises image light output units 2, image light transmission unit 3, image light emitting units 4, and a mounting unit 5.

The image light output unit 2 and a part of the image light transmission unit 3 constitute an image source side section 6 which is an incident side section. The rest of the image light transmission unit 3 and the image light emitting units 4 constitute an image display side section 7 which is an emitting side section, that is, a viewing side section. The image source side section 6 and the image display side section 7 are constructed as individual unit structures. As a result, the image source side section 6 and the image display side section 7 can be attached to and detached from each other.

Explanation of the Image Light Output Unit 2

As shown in FIG. 4 to FIG. 7, the image light output unit 2 uses light (controlled light L1) as a transmission medium to output an image (not shown) as image light L2. The image light output unit 2 includes a light source 20, a light control component 21, and a reflective image modulation device 22.

The light source 20 is a backlight to emit light. The light source 20 includes a substrate 200 and one or a plurality of LEDs 201 mounted on the substrate 200 in this example.

The light control component 21 controls the light from the light source 20 to generate a controlled light L1. The light control component 21 consists of a first diffusion sheet 211, a reflection sheet duct 210, a second diffusion sheet 212, a prism sheet 213, a wire grid film 214, and a polarizing plate 215 in this order from the light source 20 side in this example.

The reflection sheet duct 210 is formed by a reflection sheet into a duct shape to forms a reflection surface in the inner surface thereof. The reflection sheet duct 210 has a square cross section perpendicular to the center line of the duct in this example. The reflection sheet duct 210 may have a cross-sectional shape other than a square shape, for example, a rectangular, circular, elliptical, or other shape.

The first diffusion sheet 211, the reflection sheet duct 210, the second diffusion sheet 212, and the prism sheet 213 converge the light from the light source 20 to apply on the reflective image modulation device 22 uniformly. That is, the first diffusion sheet 211 converges red light, green light, and blue light from the light source 20 into a square as white light to apply on the reflective image modulation device 22.

The wire grid film 214 and the polarizing plate 215 may convert the light from the light source 20 into light whose polarization direction is matched with that of the polarization beam splitter 30 described later, that is, S polarized light in this embodiment.

The reflective image modulation device 22 is a reflective liquid crystal (LCOS) in this embodiment. The reflective image modulation device 22 reflects the controlled light L1 from the light control component 21 reflected by the polarization beam splitter 30 described later to output the image as the image light L2 by using the controlled light L1 as a medium. That is, the reflective image modulation device 22 rotates only the image light L2, which is the light forming the image, of the controlled light L1 by 90 degrees to form a P-polarized component. The reflective image modulation device 22 may be an organic LED (Light Emitting Diode) other than the reflective liquid crystal.

Explanation of the Image Light Transmission Unit 3

The image light transmission unit 3 transmits the image light L2 output from the image light output unit 2, as shown in FIG. 1 to FIG. 9. The image light transmission unit 3 includes a polarization beam splitter 30, a light reflector 31, a quarter-wave plate 32, a transit optics 33, and a light guide plate 34.

The polarization beam splitter 30 is a cube-type polarization beam splitter in this example, and is formed by sandwiching a wire grid film 301 on the slopes of two rectangular prisms 300. The polarization beam splitter 30 transmits the P-polarized component of the light (the controlled light L1 and the image light L2) and reflects the S-polarized component of the light (the controlled light L1 and the image light L2). As a result, the polarization beam splitter 30 reflects the controlled light L1 (S-polarized light) from the light control component 21 to the reflective image modulation device 22 side. Further, the polarization beam splitter 30 transmits the image light L2 (P-polarized light) from the reflective image modulation device 22 to the quarter-wave plate 32 and the light reflector 31 side. Further, the polarization beam splitter 30 reflects the image light L2 (S-polarized light) from the light reflector 31 and the quarter-wave plate 32 to the transit optics 33 side.

The light reflector 31 includes a lens (aspherical optical lens) 311 having a reflecting surface 310. The light reflector 31 reflects the image light L2 from the reflective image modulation device 22 passing through the polarization beam splitter 30 to the polarization beam splitter 30 side. Further, the light reflector 31 focuses the image of the image light L2 from the reflective image modulating device 22.

The quarter-wave plate 32 is arranged between the polarization beam splitter 30 and the light reflector 31. The quarter-wave plate 32 rotates the polarization direction of the image light L2 from the reflective image modulating device 22 by 90 degrees before entering the light reflector 31 and after reflecting from the light reflector 31.

As a result, the image light L2 from the reflective image modulating device 22 is transmitted through the quarter-wave plate 32, from the polarization beam splitter 30 side to the light reflector 31 side and from the light reflector 31 side to the polarization beam splitter 30 side. As a result, the image light L2 from the reflective image modulating device 22 passed through the quarter-wave plate 32 twice changes from P-polarized light to S-polarized light to be reflected in the polarization beam splitter 30 to the transit optics 33 side.

The transit optics 33 is a triangular prism in this example. The transit optics 33 relays to transmit the image light L2 from the reflective image modulating device 22, transmitted through the polarization beam splitter 30, transmitted through the quarter-wave plate 32, reflected by the light reflector 31, transmitted through the quarter-wave plate 32 again, and reflected by the polarization beam splitter 30 to the light guide plate 34.

The light guide plate 34 is made of a colorless transparent resin material such as acrylic resin, PC (polycarbonate), PMMA (polymethylmethacrylate, methacrylic resin), or colorless transparent glass in this example. The light guide plate 34 totally reflects the image light L2 transmitted from the transit optics 33 to guide it to the image light emitting portion 4.

Figure 8:
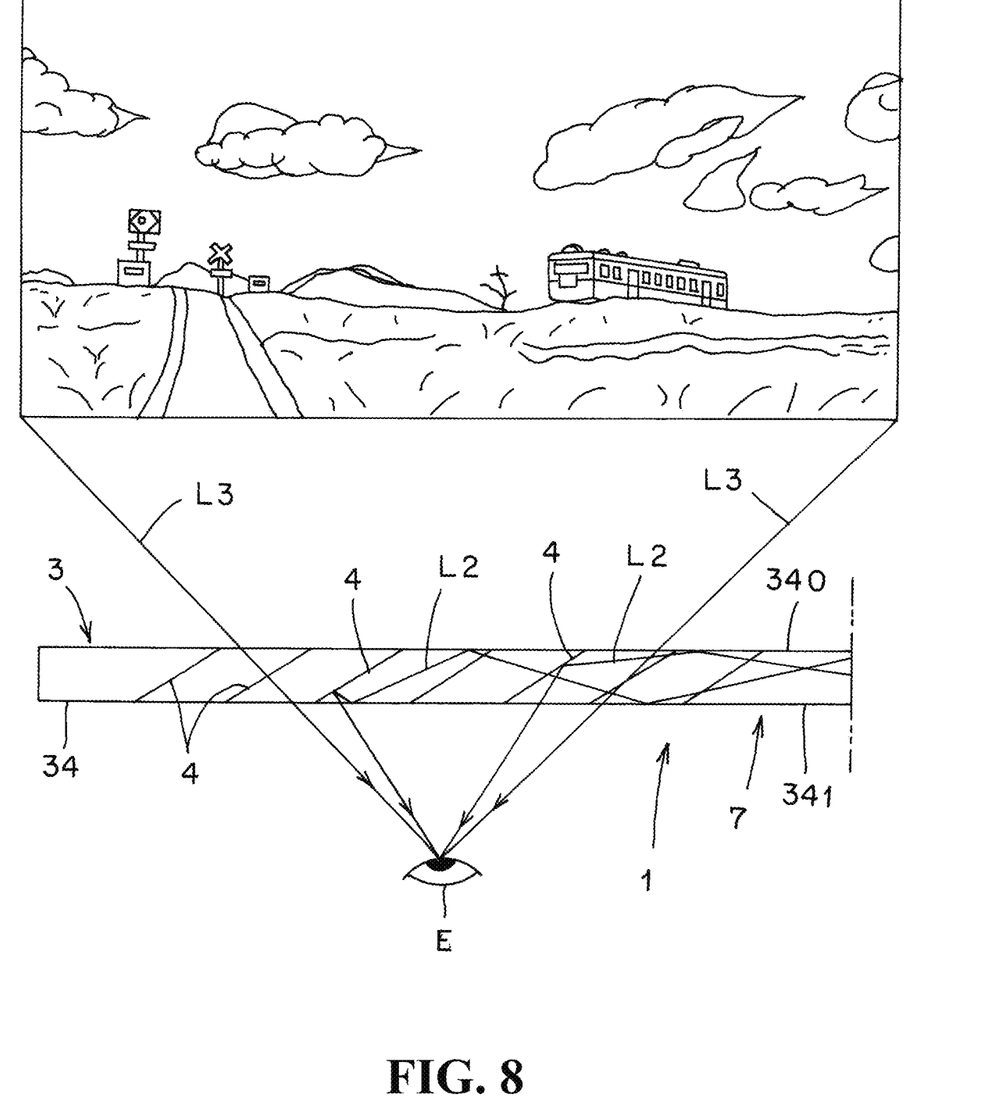
FIG. 8 is an explanatory view showing a usage state.

The light guide plate 34 has a plate shape and has two main surfaces, that is, the front surface 340 and the rear surface 341, and four auxiliary surfaces, that is, the upper surface, the lower surface, the left end surface, and the right end surface. The light guide plate 34 totally reflects the image light L2 and guides it to the image light emitting units 4 by means of the two main surfaces, the front surface 340 and the rear surface 341. As shown in FIG. 8, the front surface 340 of the light guide plate 34 faces the background side, and the rear surface 341 of the light guide plate 34 faces the eye E side of the user.

Explanation of the Image Light Emitting Units 4

Figure 9A:
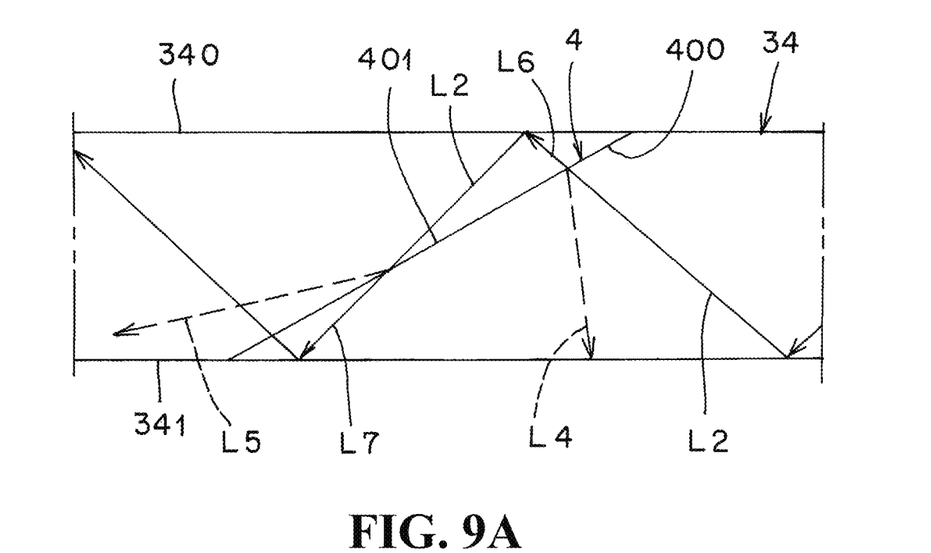
Figure 9B:
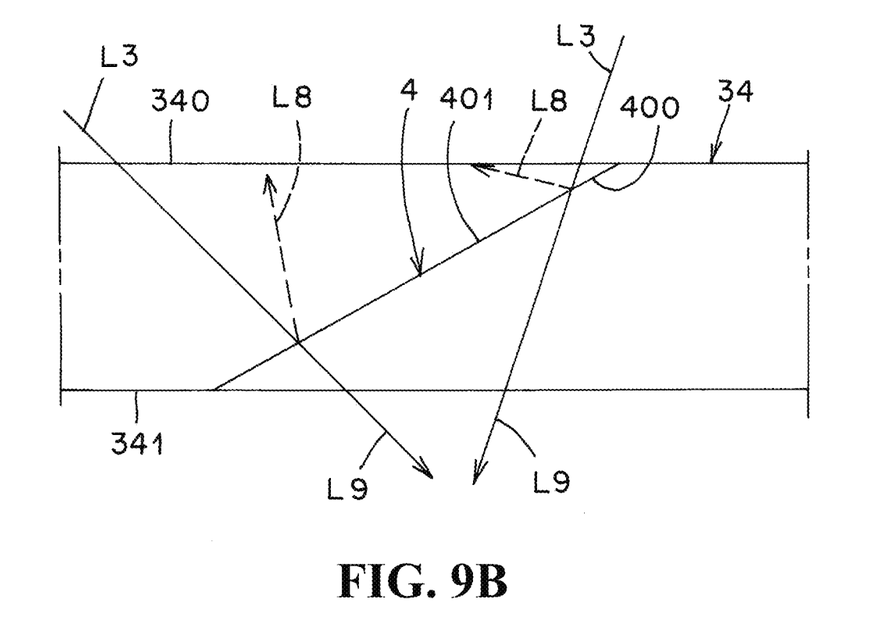

As shown in FIG. 8 and FIG. 9, the image light emitting units 4 emits the image light L2 transmitted from the image light transmission unit 3 to the outside. The image light emitting units 4 are disposed in the light guide plate 34, and comprises of a plurality of half mirrors that emit the image light L2 guided through the light guide plate 34 to the outside. Hereinafter, the image light emitting units 4 are referred to as half mirrors.

Each half mirror 4 is formed by laminating dielectric layer films. The number of half mirrors 4 shown in FIG. 8 is seven. As shown in FIG. 9, one surface 400 of the half mirror 4 faces the rear surface 341 of the light guide plate 34, and the other surface 401 of the half mirror 4 faces the front surface 340 of the light guide plate 34.

As shown in FIG. 8, the image light L2 reflected by the one surface 400 of the half mirror 4 goes out from the rear surface 341 of the light guide plate 34 and enters the eye E of the user (not shown). Thereby, the image light L2 enters the eye E of the user as an image, and the user can visually recognize the image.

The wearable image display 1 according to this embodiment, that is, the wearable image display 1 including the light guide plate 34 in which the plurality of half mirrors 4 are disposed, may be used as an AR in which information is superimposed on a real background. Therefore, as shown in FIG. 8, when the user visually recognizes the image emitted from the plurality of half mirrors 4 in the light guide plate 34, the background light L3 is also transmitted through the light guide plate 34 and the plurality of half mirrors 4. Then, the light enters the eye E of the user.

At this time, the background light L3 is incident on the plurality of half mirrors 4 at various angles. In FIG. 8, the background light L3 on the right side enters the half mirror 4 at a large angle. On the other hand, the background light L3 on the left side enters the half mirror 4 at a small angle.

Explanation of the Reflectance of the Half Mirrors 4

The plurality of half mirrors 4 have the same reflectance regardless of the angle of incidence on the surface. That is, the reflection rate of the reflected light L4 (the transmission rate of the transmitted light L6) is same with that of the reflected light L5 (that of the transmitted light L6) with respect to the surface (one surface 400 and the other surface 401) of a certain one half mirror 4 regardless of the incident angle of the image light L2. For example, as shown in FIG. 9A, the reflection rate on which the image light L2 is reflected by the one surface 400 of one of the half mirrors 4 to the reflected light L4 is same with that on which the light L2 is reflected by the other surface 401 of that same half mirror 4 to the reflected light L5.

It is same for light other than the image light L2 guided and transmitted through the light guide plate 34, for example, background light L3 that passes through the light guide plate 34 from the front surface 340 to the rear surface 341. That is, as shown in FIG. 8, the background light L3 on the right side enters the half mirror 4 at a large angle, while the background light L3 on the left side enters the half mirror 4 at a small angle.

Even in such a case, as shown in FIG. 9B, when the background light L3 passes through the half mirror 4 in the light guide plate 34, the reflection rate of the reflected light 8 (the transmission rate of the transmitted light L9) is irrespective of the incident angle of the background light L3 with respect to the half mirror 4. As a result, it makes the brightness of the transmitted light L9 transmitted through the plurality of half mirrors 4 in the light guide plate 34 of the background light L3 uniform.

Explanation of the Mounting Unit 5

Figure 1:
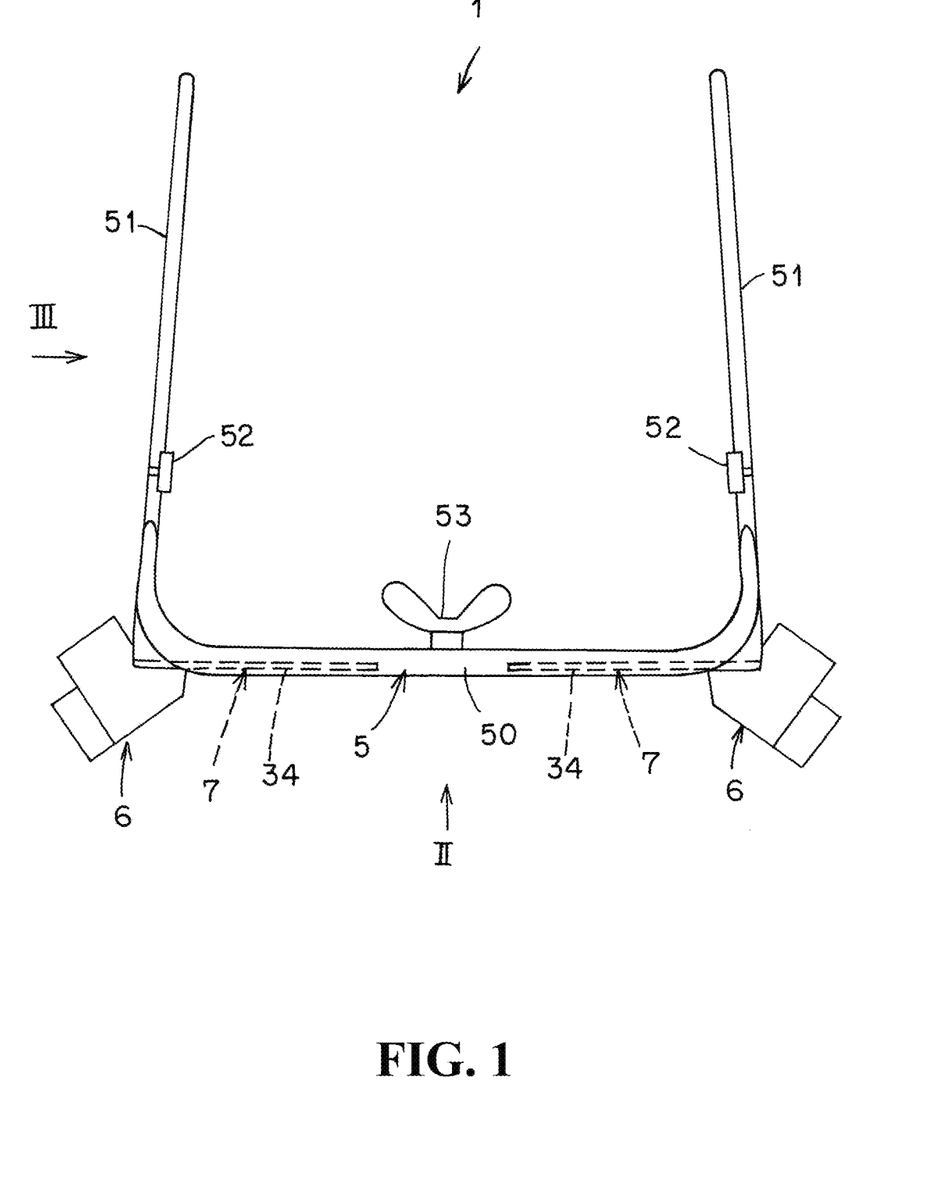
FIG. 1 is a plan view showing an embodiment of a wearable image display according to the present invention.
Figure 2:
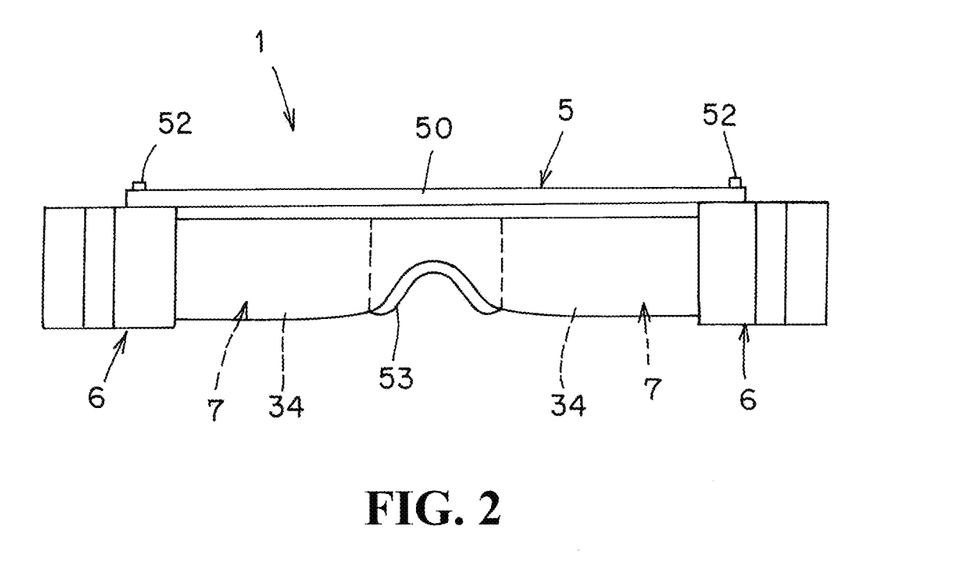
FIG. 2 is a front view (view from arrow II in FIG. 1) showing the wearable image display.
Figure 3:
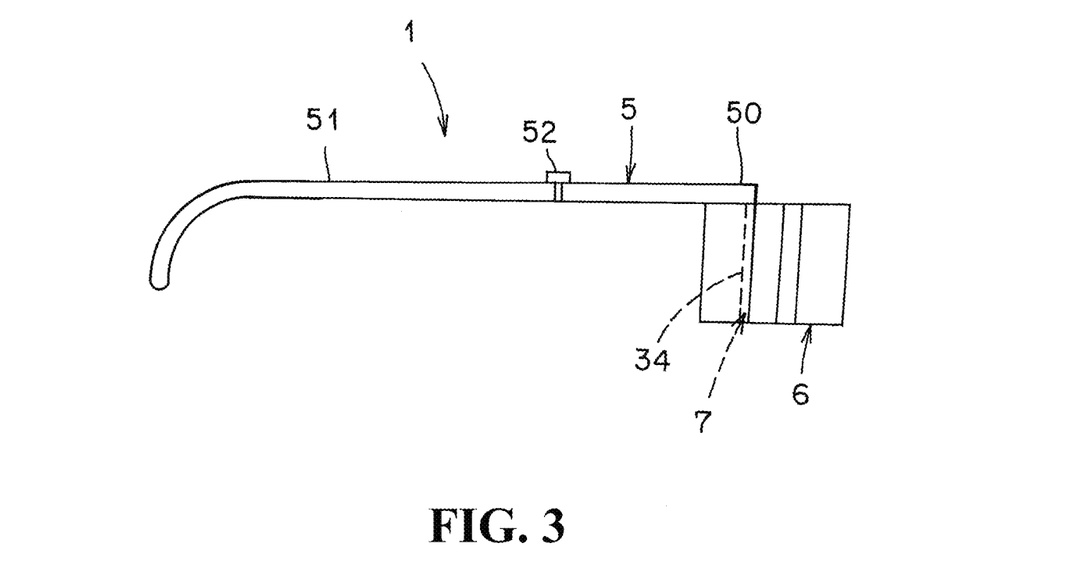
FIG. 3 is a left side view (view from the arrow III in FIG. 1) showing the wearable image display.
Figure 4A:
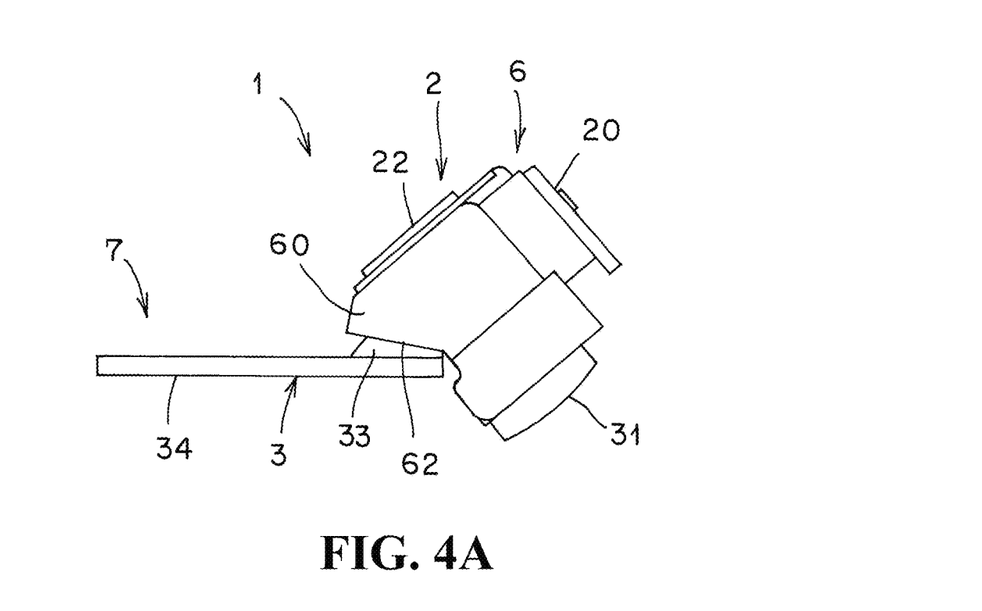
FIG. 4A is an explanatory view showing a state where the image source side portion and the image display side portion are integrally assembled.
Figure 4B:
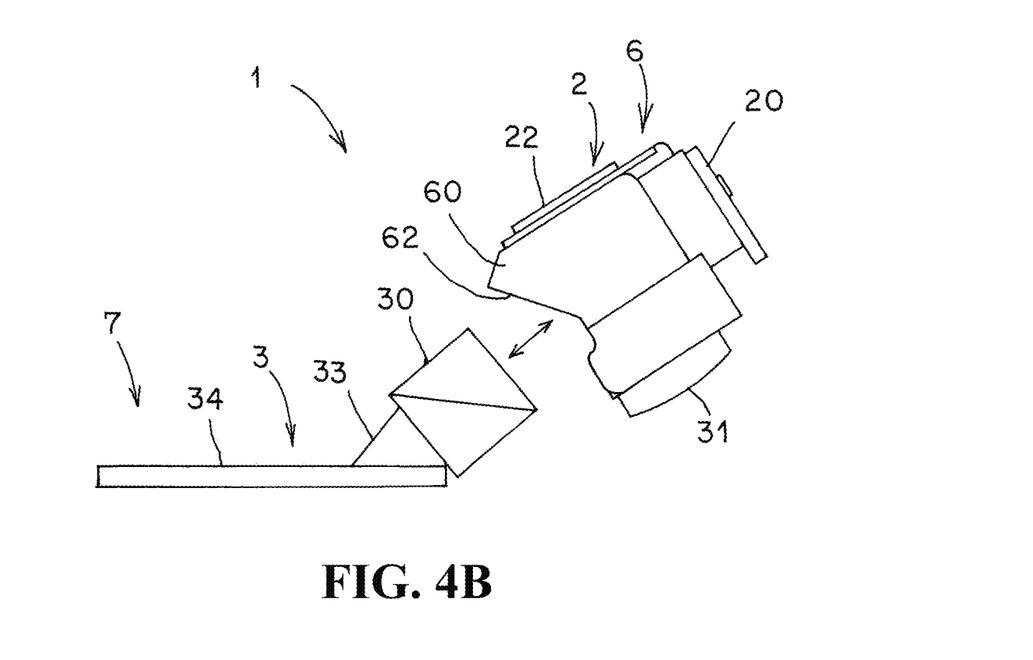
FIG. 4B is an explanatory view showing a state where the image source side portion and the image display side portion are separately detached.

As shown in FIG. 1 to FIG. 3, the mounting unit 5 is of a spectacle type to be mounted on the face of the user in this example. The mounting unit 5 comprises a front portion 50 and left and right temple portions 51. The left and right temple portions 51 are foldably attached to the left and right ends of the front portion 50 via left and right hinges 52. A nose pad 53 is provided at the lower center of the front portion 50.

On both left and right sides of the front portion 50, image display side sections 7 are attached respectively. That is, the light guide plates 34 of the left and right image display side sections 7 are attached to respective left and right sides of the front portion 50. In addition, in order to protect the light guide plates 34, a transparent plate may be fixed to the surface 340 side of the light guide plates 34. In this case, the transparent plate may be directly attached to the front portion 50, and the light guide plates 34 may be indirectly attached to the front portion 50 via the transparent plate.

The wearable image display 1 according to this embodiment is configured by detachably attaching the image source side sections 6 to the image display side section 7 attached to the mounting unit 5.

Explanation of the Image Source Side Section 6

As shown in FIG. 4 to FIG. 7, the image source side section 6 is composed of the light source 20, the light control component 21, the reflective image modulating device 22, the light reflector 31 and the quarter-wave plate 32 in a unit structure. The image source side section 6 has a mounting member 60.

The mounting member 60 comprises a hollow housing or casing. The surface of the mounting member 60 is surface-treated. The surface treatment may be for preventing the light from the light source 20, the controlled light L1 and the image light L2 from being reflected to become stray light, for example, making the surface black.

On the mounting member 60, the reflective image modulation device 22 and the light reflector 31/the quarter-wave plate 32 are attached respectively so as to face each other with a space 61 therebetween. The light source 20 and the light control component 21 are attached to the mounting member 60 in a direction intersecting with the facing direction of the reflective image modulation device 22, the light reflector 31, and the quarter-wave plate 32, respectively.

An opening 62 is provided in a portion of the mounting member 60, facing the light source 20 and the light control component 21 with a space 61 therebetween. The opening 62 communicates with the space 61 such that the polarization beam splitter 30 of the image display side section 7 can be stored in and taken out of the space 61.

Explanation of the Image Display Side Section 7

As shown in FIG. 4 to FIG. 7, the image display side section 7 is composed of the polarization beam splitter 30, the transit optics 33, the light guide plate 34, and the plurality of half mirrors 4 in a unit structure. In the image display side section 7, the polarization beam splitter 30 and the transit optics 33 are fixed to each other, and the transit optics 33 and the light guide plate 34 are fixed to each other.

At least one of the polarization beam splitter 30, the transit optics 33, and the light guide plate 34 may be provided with a cover (not shown). The cover does not disturb the optical paths of the controlled light L1 and the image light L2, and does not disturb the transmission light L9 of the image and the background light L3 from the light guide plate 34 entering the eyes E of the user.

The refractive index n1 of the two rectangular prisms 300 of the polarization beam splitter 30 is larger than the refractive index n2 of the transit optics 33 and the refractive index n3 of the light guide plate 34. The refractive index n2 of the transit optics 33 and the refractive index n3 of the light guide plate 34 are equivalent. That is, the following expression (1) is satisfied.

$$n1 > n2 = n3 \tag{1}$$

Explanation of the Mounting Structure

The mounting structure for detachably mounting a unit structure of the image source side section 6 and a unit structure of the image display side section 7 is provided on the mounting member 60 of the image source side section 6 and the cover of the image display side section 7. The mounting structure may be, for example, an concavo-convex elastic fitting structure, a screwing structure, and a structure using a separate set screw. The mounting structure of the image display side section 7 may be provided on at least one of the polarization beam splitter 30, the transit optics 33, and the light guide plate 34 instead of the cover, or may be provided on the mounting unit 5.

Explanation of the Embodiment

The wearable image display 1 according to this embodiment is configured as described above, and its operation will be described below.

The light source 20 is turned on. Then, as shown in FIG. 7, the light emitted from the light source 20 is controlled by the light control component 21 to become the controlled light L1 (S-polarized light). The controlled light L1 is reflected by the polarization beam splitter 30 toward the reflective image modulation device 22 side, and is reflected by the reflective image modulation device 22 to become image light L2.

The image light L2 from the reflective image modulating device 22 passes through the polarization beam splitter 30 and the quarter-wave plate 32, is reflected by the light reflector 31, and passes through the quarter-wave plate 32. As a result, the image light L2 from the reflective image modulating device 22 that has passed through the quarter-wave plate 32 twice becomes S-polarized light to be reflected by the polarization beam splitter 30 toward the transit optics 33.

The image light L2 reflected to the transit optics 33 is transmitted from the transit optics 33 to the light guide plate 34 as shown in FIGS. 7 and 8, and guided and transmitted in the light guide plate 34. The image light L2 guided and transmitted in the light guide plate 34 is reflected by the each one surface 400 of the plurality of half mirrors 4 arranged in the light guide plate 34.

The image light L2 reflected by the one surface 400 of the half mirror 4 exits from the rear surface 341 of the light guide plate 34 and enters the eye E of the user. Thereby, the image light L2 enters the eye E of the user as an image, and the user can visually recognize the image. At this time, the background light L3 also passes through the light guide plate 34 and the plurality of half mirrors 4 and enters the eye E of the user. In this way, the user can visually recognize the background together with the image.

Explanation of Effects of the Embodiment

The wearable image display 1 according to this embodiment has the configuration and operation as described above, and the effects thereof will be described below.

In the wearable image display 1 according to this embodiment, the image source side section 6 and the image display side section 7 are separately divided into unit structures. As a result, in the wearable image display 1 according to this embodiment, the image source side section 6 and the image display side section 7 can be attached to and detached from each other. As a result, the wearable image display 1 according to this embodiment can be easily maintained and can be used easily as compared with the disclosures of the above-mentioned PTL 1 and PTL 2.

That is, the wearable image display 1 according to this embodiment can be easily maintained by detaching the image source side section 6 and the image display side section 7 and maintaining these separately. The wearable image display 1 according to the present embodiment can be used simply by attaching the image source side section 6 and the image display side section 7 to integrate these. In the wearable image display 1 according to this embodiment, the image source side section 6 and the image display side section 7 can be efficiently manufactured separately.

The wearable image display 1 according to this embodiment includes a glasses-type mounting unit 5 to be mounted on the user's face, and an image display side section 7 is mounted on the mounting unit 5. As a result, the wearable image display 1 according to this embodiment can be used conveniently by attaching the image source side section 6 to the image display side section 7 attached to the mounting unit 5 to use the image source side section 6 and the image display side section 7 as the wearable image display 1.

In the wearable image display 1 according to this embodiment, the image light output unit 2 includes the light source 20, the light control component 21, and the reflective image modulation device 22, the image light transmission unit 3 includes the polarization beam splitter 30, the light reflector 31, the quarter-wave plate 32, the transit optics 33, and the light guide plate 34, and the image light emitting units 4 include a plurality of half mirrors 4. In the wearable image display 1 according to this embodiment, the image source side section 6 is configured by the light source 20, the light control component 21, the reflective image modulating device 22, the light reflector 31, and the quarter-wave plate 32 as a unit structure, and the image display side section 7 is configured by the polarization beam splitter 30, the transit optics 33, the light guide plate 34, and the plurality of half mirrors 4 as unit structure. As a result, the wearable image display 1 according to this embodiment can have a unit structure in which the image source side section 6 and the image display side section 7 are detachable from each other. Moreover, the wearable image display 1 according to this embodiment allows the user to surely view the image by the image light output unit 2, the image light transmission unit 3, and the plurality of half mirrors 4.

Since the wearable image display 1 according to this embodiment is configured by attaching the reflective image modulating device 22 and the light reflector 31 on the mounting member 60 of the image source side section 6 so as to face each other with a space 61 therebetween, as shown in FIG. 5 and FIG. 6, the distance "d" between the reflective image modulation device 22 and the light reflector 31 can be kept constant. As a result, in the wearable image display 1 according to this embodiment, when the image source side section 6 and the image display side section 7 are removed, maintained separately (for example, perform image adjustment), and then attached again each other, the distance "d" between the reflective image modulation device 22 and the light reflector 31 is maintained in constant. As a result, in the wearable image display 1 according to this embodiment, the focus of the image is constant, and when the image source side section 6 and the image display side section 7 are attached/detached, the performance is not affected. That is, the wearable image display 1 according to this embodiment has stable performance even if the image source side section 6 and the image display side section 7 are detachable structures.

In the wearable image display 1 according to this embodiment, since the surface of the mounting member 60 of the image source side section 6 is subjected to the surface treatment, it can be prevent the light from the light source 20, the controlled light L1 and the image light L2 from being reflected to become stray light.

In the wearable image display 1 according to this embodiment, the refractive index n1 of the polarization beam splitter 30 is larger than the refractive index n2 of the transit optics 33 and the refractive index n3 of the light guide plate 34. As a result, the wearable image display 1 according to this embodiment can reduce the distance d between the reflective image modulating device 22 and the light reflector 31, so that the wearable image is transmitted via the image source side section 6. The entire display 1 can be downsized.

That is, the distance "d" is the sum of the distance "T1" of the gap between the reflective image modulation device 22 and the polarization beam splitter 30, the width "T2" of the polarization beam splitter 30, and the distance "T3" of the gap between the polarization beam splitter 30 and the light reflector 31. That is, the following expression (2) is satisfied.

$$d = T1 + T2 + T3 \tag{2}$$

The optical path length "D" for focusing the image is determined by summing the product of the distance "T1" of the gap between the reflective image modulation device 22 and the polarization beam splitter 30 times the refractive index of air (approximately 1), the product of the width "T2" of the polarization beam splitter 30 times the refractive index n1 of the polarization beam splitter 30, and the product of the distance "T3" of the gap between the polarization beam splitter 30 and the light reflector 31 times the refractive index of air (approximately 1). That is, the following expression (3) is satisfied.

$$D = T1 \times 1 + T2 \times n1 + T3 \times 1 \tag{3}$$

When it is assumed that the optical path length "D" for focusing the image is constant, the width "T2" of the polarization beam splitter 30 can be reduced by increasing the refractive index n1 of the polarization beam splitter 30 in the expression (3). Accordingly, when the refractive index n1 of the polarization beam splitter 30 is made larger than the refractive index n2 of the transit optics 33 and the refractive index n3 of the light guide plate 34, the distance "d" between the reflective image modulation device 22 and the light reflector 31 is increased. The wearable image display 1 as a whole can be downsized via the image source side section 6.

In the wearable image display 1 according to this embodiment, the transit optics 33 and the light guide plate 34 may have the same refractive index n2=n3, and the refractive index is not restricted for the transit optics 33 and the light guide plate 34. As a result, the wearable image display 1 according to this embodiment, the transit optics 33 and the light guide plate 34 can be made of materials having small refractive indices n2 and n3 in low cost, so that the manufacturing cost can be lowered.

In the wearable image display 1 according to this embodiment, the plurality of half mirrors 4 have the same reflectance regardless of the incident angle on the surfaces of the half mirrors 4. As a result, in the wearable image display 1 according to this embodiment, the reflection rates of the reflected lights L4 and L5 (the transmission rate of the transmitted light L6 and L7) with respect to the surfaces (the one surface 400 and the other surface 401) of the half mirror 4 are same regardless of the incident angle of the image light L2. As a result, in the wearable image display 1 according to this embodiment, the brightness of the images displayed by the plurality of half mirrors 4 and emitted from the rear surface 341 of the light guide plate 34 becomes substantially uniform, and the user can enjoy watching images with almost uniform brightness, that is, high-quality images.

In the wearable image display 1 according to this embodiment, when the background light L3 passes through the half mirrors 4 in the light guide plate 34, the reflected light L8 is reflected in a same rate and the transmitted light L9 is transmitted in a same rate regardless of the incident angle of the background light L3 with respect to the half mirrors 4. As a result, in the wearable image display 1 according to this embodiment, the brightness of the transmitted light L9 transmitted through the plurality of half mirrors 4 in the light guide plate 34 of the background light L3 is made uniform, so that the user can also enjoy watching scenery with almost uniform brightness through the light guide plate 34 and the plurality of half mirrors 4.

Explanation of a Modified Example

Figure 10:
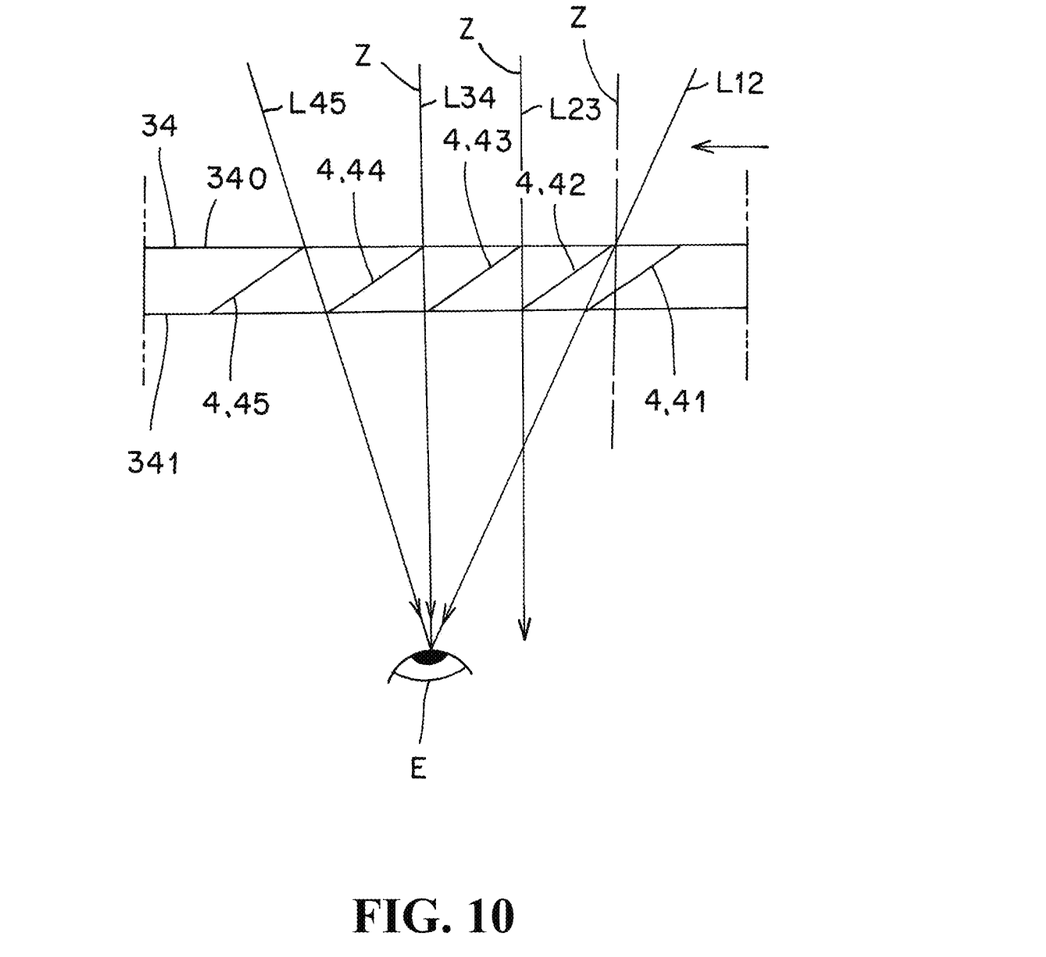
FIG. 10 is an explanatory view showing a modified disposition example of a plurality of half mirrors in the light guide plate.

FIG. 10 is an explanatory view showing a modified example of the displacement of a plurality of half mirrors in the light guide plate. Hereinafter, it will be described a modified example of the displacement of the plurality of half mirrors in the light guide plate.

The ends of two adjacent half mirrors 4 in the plurality of half mirrors 4 align in or overlap on the normal line Z perpendicular to the surface, at least one of the front surface 340 and the rear surface 341, of the light guide plate 34. Five half mirrors 41, 42, 43, 44, and 45 in FIG. 10 will be referred from the right side to the left side as the first half mirror 41, the second half mirror 42, the third half mirror 43, and the fourth half mirror 44. It is referred to as the fifth half mirror 45. In FIG. 10, the arrow from the right side to the left side indicates the direction in which the image light is guided to propagate in the light.

In FIG. 10, the left end of the first half mirror 41 and the right end of the second half mirror 42 overlap with the normal line Z. It reaches the extension line of the line segment L12 connecting the left end of the first half mirror 41 and the right end of the second half mirror 42 to the eye E of the user.

The left end of the second half mirror 42 and the right end of the third half mirror 43 align in the normal line Z. It does not reach the extension line of the line segment L23 connecting the left end of the second half mirror 42 and the right end of the third half mirror 43 to the eye E of the user. The line segment L23 and the normal line Z are parallel to each other.

Further, the left end of the third half mirror 43 and the right end of the fourth half mirror 44 align in the normal line Z. The extension line of the line segment L34 connecting the left end of the third half mirror 43 and the right end of the fourth half mirror 44 reach the user's eye. The line segment L34 and the normal line Z are parallel to each other.

Furthermore, the extension line of the line segment L45 connecting the left end of the fourth half mirror 44 and the right end of the fifth half mirror 45 reach the user's eye E. The left end of the fourth half mirror 44 and the right end of the fifth half mirror 45 are displaced to the left and right with respect to the normal line Z.

In this way, when the ends of two adjacent half mirrors 4 of the plurality of half mirrors 4 align in or overlap on the normal line Z of the front surface 340 and the rear surface 341 of the light guide plate 34, the extended line of the line segments L12 and L34 connecting the ends of the half mirrors 4 reaches the eye E of the user. As a result, when the five half mirrors 41, 42, 43, 44 and 45 are seen from the eye E of the user, there is no or a small gap between the adjacent half mirrors 41, 42, 43, 44, 44 and 45. Therefore, the image is displayed by the plurality of half mirrors 4 having no gap or a small gap so that the user can enjoy watching the high quality image.

As the fourth half mirror 44 and the fifth half mirror 45 adjacent thereof, if the left end of the right fourth half mirror 44 and the right end of the fifth half mirror 45 are displaced apart in left and right with respect to the normal line Z, the extension line of the line segment L45 connecting the left end of the fourth half mirror 44 and the right end of the fifth half mirror 45 may reach the eye E of the user.

Further, as the second half mirror 42 and the third half mirror 43 adjacent thereof, if the left end of the second half mirror 42 and the right end of the third half mirror 43 align in the normal line Z, the extension line of the line segment L23 connecting the left end of the second half mirror 42 and the right end of the third half mirror 43 may not reach the eye E of the user. In this case also, by closing the gap between the second half mirror 42 and the third half mirror 43, the line segment L23 extending between the left end of the second half mirror 42 and the right end of the third half mirror 43 may reach the eye E of the user.

Explanation of Other than the Embodiment

In the above-described embodiment, it is used a glasses-type mounting unit as the mounting unit 5, that is detachably mounted on the user's face. However, in the present invention, any mounting unit may be used other than the glasses-type one. For example, it may be used a mounting unit that does not correspond to both eyes of the user but corresponds to one eye, or a mounting portion such as goggles.

It should be noted that the present invention is not limited to the above embodiment and modification.

The invention claimed is:

1. A wearable image display comprising:
   an image light output unit for outputting an image as image light;
   an image light transmission unit for transmitting the image light output from the image light output unit;
   an image light emitting unit for emitting the image light transmitted from the image light transmission unit to the outside;
   wherein:
   the image light output unit and a part of the image light transmission unit constitutes an image source side section;
   the rest of the image light transmission unit and the image light emitting unit constitute an image display side section;
   the image source side section and the image display side section are separately divided into unit structures,
   the image light output unit includes:
      a light source,
      a light control component for controlling the light from the light source to make a controlled light, and
      a reflective image modulation device for reflecting the controlled light to output the image light;
   the image light transmission unit includes:
      a polarization beam splitter for reflecting the controlled light from the light control component to the reflective image modulation device,
      a light reflector for reflecting the image light from the reflective image modulation device passing through the polarization beam splitter to the polarization beam splitter side,
      a quarter-wave plate disposed between the polarization beam splitter and the light reflector,
      a transit optics for relaying the image light from the reflective image modulation device, passing though the polarization beam splitter, passing though the quarter-wave plate, reflected by the light reflector, passing though the quarter-wave plate again and reflected by the polarization beam splitter, and
      a light guide plate for guiding the image light relayed by the transit optics to the image light output unit;
   the image light output unit includes:
      a plurality of half mirrors disposed in a light guide plate for emitting the image light guided in the light guide plate to the outside;
   the image source side section includes the light source, the light control component, the reflection type image modulation device, the light reflector and the quarter-wave plate in a unit structure; and
   the image display side section includes the polarization beam splitter, the transit optics, the light guide plate, and the plurality of half mirrors in a unit structure.

2. The wearable image display according to claim 1 further comprising a mounting unit to be worn on a user's face, wherein the image display side section is attached to the mounting unit.

3. A wearable image display comprising:
   an image light output unit for outputting an image as image light;
   an image light transmission unit for transmitting the image light output from the image light output unit;
   an image light emitting unit for emitting the image light transmitted from the image light transmission unit to the outside;
   wherein:
   the image light output unit and a part of the image light transmission unit constitutes an image source side section;
   the rest of the image light transmission unit and the image light emitting unit constitute an image display side section;
   the image source side section and the image display side section are separately divided into unit structures,
   the image source side section includes a mounting member on which the reflective image modulation device and the light reflector/the quarter-wave plate are attached respectively facing each other with a space therebetween, and the light source and the light control component are attached in a direction intersecting with the facing direction of the reflective image modulation device, the light reflector and the quarter-wave plate respectively,
   an opening is provided in a portion of the mounting member facing the light source and the light control component with a space therebetween, and
   the opening communicates with the space such that the polarization beam splitter is stored in and taken out of the space.

4. The wearable image display according to claim 1, wherein:
   the image display side section is configured as the polarization beam splitter and the transit optics are fixed to each other, and the transit optics and the light guide plate are fixed to each other, and
   the refractive index of the polarization beam splitter is larger than the refractive index of the transition optical body and the refractive index of the light guide plate.

5. The wearable image display according to claim 1, wherein:
   The plurality of half mirrors have a same reflectance regardless of the angle of incidence on surfaces.

6. The wearable image display according to claim 3 further comprising a mounting unit to be worn on a user's face, wherein the image display side section is attached to the mounting unit.

* * * * *